United States Patent [19]
Sangret

[11] Patent Number: 5,291,963
[45] Date of Patent: Mar. 8, 1994

[54] POWER STEERING SYSTEM

[75] Inventor: Henry C. Sangret, St. Clair Shores, Mich.

[73] Assignee: TRW Inc., Lyndhurst, Ohio

[21] Appl. No.: 938,757

[22] Filed: Sep. 19, 1992

[51] Int. Cl.$^5$ .......................... B62D 5/083; F15B 9/08
[52] U.S. Cl. ..................................... 180/141; 180/143; 91/371
[58] Field of Search .................. 180/141, 143; 91/371, 91/375 A

[56] References Cited

U.S. PATENT DOCUMENTS

| | | | |
|---|---|---|---|
| 4,811,806 | 3/1989 | Lang | 180/141 |
| 4,819,545 | 4/1989 | Dymond | 91/371 |
| 5,046,574 | 9/1991 | Goodrich et al. | 180/143 |
| 5,058,696 | 10/1991 | Prebay et al. | 180/141 |
| 5,070,956 | 12/1991 | Pawlak et al. | 180/141 X |
| 5,070,957 | 12/1991 | Harkrader et al. | 180/141 |
| 5,070,958 | 12/1991 | Goodrich et al. | 180/143 |
| 5,092,418 | 3/1992 | Suzuki et al. | 180/141 X |

Primary Examiner—Margaret A. Focarino
Assistant Examiner—C. Mattix
Attorney, Agent, or Firm—Tarolli, Sundheim & Covell

[57] ABSTRACT

A power steering control valve includes relatively rotatable inner and outer valve members. A power steering resistance control system resists relative rotation between the inner and outer valve members with a force which varies as a function of variations in vehicle speed. The power steering resistance control system includes a force transmitting member which rotates with the outer valve member and moves axially relative to the inner and outer valve members. Fluid pressure is applied against the force transmitting member urging it in a first direction along the axis of rotation of the valve members. Fluid pressure is also applied against the opposite side of the force transmitting member to urge it in the opposite direction along the axis of rotation of the valve members. A speed responsive control valve, connected with a fluid return conduit for the power steering valve is operable to vary the fluid pressure applied against the opposite side of the force transmitting member as a function of variations in vehicle speed. At relatively low vehicle speeds, the fluid pressure force applied against the opposite of the force transmitting member is relatively large and it is easy to actuate the steering control valve. As vehicle speed increases, the fluid pressure force applied against the force transmitting member decreases and the resistance to actuation of the steering control valve increases.

17 Claims, 2 Drawing Sheets

POWER STEERING SYSTEM

BACKGROUND OF THE INVENTION

The present invention relates to a vehicle power steering system, and more specifically to a hydraulic vehicle power steering system which transmits a larger manual steering effort to the steered wheels at higher vehicle speeds than is transmitted at lower vehicle speeds.

A known rotary power steering directional control valve has an inner valve member (valve core) which is coaxial with and rotatable relative to an outer valve member (valve sleeve). To effect actuation of a power steering motor to turn steerable vehicle wheels, the inner valve member is rotated relative to the outer valve member for a few degrees against the bias of a torsion bar. Since actuation of the control valve is resisted by only the torsion bar, the resistance to actuation of the valve does not vary as a function of vehicle speed. The construction of this known power steering control valve is described in U.S. Pat. No. 4,276,812 issued Jul. 7, 1981 and entitled "Power Steering Valve and Method of Making the Same".

It is known to increase the resistance felt by an operator of a vehicle to actuation of a power steering system as vehicle speed increases by having the fluid pressure in a reaction chamber decrease as vehicle speed increases. The fluid pressure reaction chamber is provided to regulate the torque required to rotate an inner valve member relative to an outer valve member. Decreasing the fluid pressure in the reaction chamber increases the resistance to relative rotation between a pair of valve members which control flow to a power steering motor. U.S. Pat. No. 4,819,545 is one example of such a system.

SUMMARY OF THE INVENTION

The present invention provides a new and improved apparatus for use in a vehicle to control the operation of a hydraulic power steering motor. The apparatus includes a manually actuated hydraulic, rotary, directional steering control valve assembly having relatively rotatable inner and outer valve members. The relative rotation of the valve members provides flow and pressure control of the hydraulic fluid from a pump to the steering motor and its return to a reservoir. A speed responsive control unit is connected in fluid communication with a first fluid pressure chamber in the control valve by a conduit through which hydraulic fluid from the power steering motor is returned to a reservoir. The speed responsive control unit contains a control algorithm which is programmed to decrease the fluid pressure in the first fluid pressure chamber as vehicle speed increases. The decrease in pressure in the first chamber regulates the torque required to displace the inner valve member relative to the outer valve member. As the fluid pressure in the first fluid pressure chamber decreases resistance to relative rotation between the inner and outer valve members is increased and to the vehicle operator, the steering feels more like a manual steering gear.

In a preferred embodiment of the present invention, a force transmitting member serves as a clutching mechanism and provides resistance to relative rotation between the inner and outer valve members with a force which increases with increasing vehicle speed. The force transmitting member is urged axially against the influence of pressure in the first pressure chamber by fluid pressure in a second chamber to apply a force resisting rotation of the inner valve member relative to the outer valve member. The pressure in the first chamber decreases as vehicle speed increases and increases as vehicle speed decreases. Therefore, the resistance to relative rotation between the valve members decreases with decreasing vehicle speed and increases with increasing vehicle speed.

BRIEF DESCRIPTION OF THE DRAWINGS

The foregoing and other features of the present invention will become more apparent to one skilled in the art to which the present invention relates upon reading the following description of a preferred embodiment of the invention with reference to the accompanying drawings, wherein.

DESCRIPTION OF A PREFERRED EMBODIMENT

Figure 1:
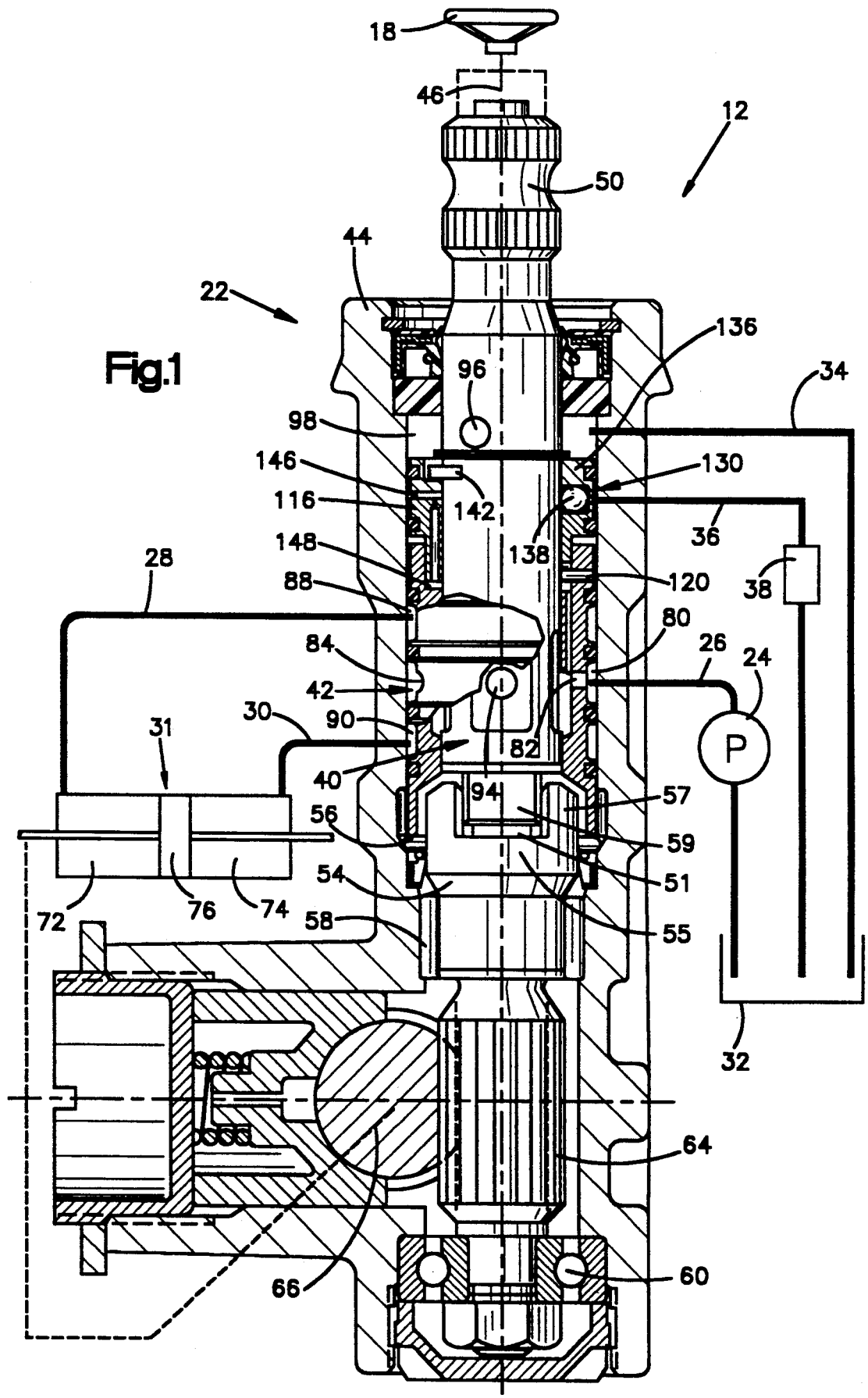
FIG. 1 is a schematic view of a vehicle power steering system showing a power steering control valve in section.

A vehicle power steering system 12 (FIG. 1) is operable to turn steerable vehicle wheels (not shown) upon rotation of a steering wheel 18 by an operator of the vehicle. Rotation of the steering wheel 18 actuates a hydraulic power steering directional control valve 22 to port hydraulic fluid from an engine driven pump 24 and supply conduit 26 to either one of a pair of motor conduits 28 and 30. The high pressure fluid conducted from the supply conduit 26 through one of the motor conduits 28 or 30 effects operation of a power steering motor 31 to turn the steerable vehicle wheels in one or another direction. Simultaneously, fluid is conducted from the motor 31 to a reservoir 32 through the other one of the motor conduits 28 or 30, the control valve 22, and return conduit 34. Fluid is also conducted from the control valve 22 to the reservoir 32 by a return conduit 36 and a speed responsive control unit 38.

The control valve 22 includes an inner rotary valve member 40, and an outer rotary cylindrical valve member or sleeve 42. The outer valve member 42 encloses the inner valve member 40. The inner valve member 40 and outer valve member 42 are rotatable relative to (a) each other, and (b) a housing 44 about a common central axis 46.

The inner valve member 40 is formed on a part of a cylindrical input member or valve stem 50 which is connected with the steering wheel 18. The outer valve member 42 is connected with a follow-up member 54 by a pin 56. The follow-up member 54 is rotatably supported in the housing 44 by bearings 58 and 60. The follow-up member 54 has a pinion gear portion 64 which is in meshing engagement with the toothed portion of a rack 66. The rack 66 is drivingly connected with the power steering motor 31 and steerable vehicle wheels as is well known in the art.

The inner valve member 40 and the outer valve member 42 are drivingly interconnected through a resilient torsion bar 51 (only a portion of which is visible in FIG. 1), as is well known in the art, and a drive mechanism 55 defined by dogs 57 on an end of the follow-up member 54 and tines 59 on an end of the input member 50. The dogs 57 and the tines 59 allow limited rotational movement of the input member 50 and the inner valve member 40 relative to the follow-up member 54 when the torque in the pinion gear portion 64 required to displace the rack 66 exceeds the torque required to deflect the torsion bar 51. Hence, the input member 50 can be displaced by a few degrees relative to the follow-up member 54 with displacement occurring in the torsion bar 51.

The outer valve member 42 is fixed against rotation relative to the follow-up member 54 by pin 56. Accordingly, the input member 50 and the inner valve member 40 can be rotated slightly with respect to the follow-up member 54 and the outer valve member 42. The amount of relative rotation, within the limits of the clearance between the dog and tine drive mechanism 55, is proportional to the torque in the torsion bar 51 and other elements of the manual steering drive line, such as the follow-up member 54 and the input member 50. This relative rotation between the input member 50 and the outer valve member 42 is used to control the flow of hydraulic fluid from the pump 24 to the steering motor 31.

The pump 24 is a fixed positive displacement pump. The control valve 22 (FIG. 1) is of the open-center type. Therefore, when the control valve 22 is in an initial or unactuated neutral condition, that is when there is no steering demand, the fluid from the pump 24 is conducted through the motor conduits 28 and 30 to motor cylinder chambers 72 and 74 on opposite sides of a piston 76 which is connected to the rack 66 in the power steering motor 31. Also, fluid flow from the pump 24 is directed by the control valve 22 to the return conduit 34 and reservoir 32. The pressure required to circulate the hydraulic fluid through the steering mechanism 12 to the reservoir 32 is relatively low because there is no restriction of flow. Hence, fluid is circulated at low pressure, by the pump 24 through the valve 22 and back to the reservoir 32.

Upon rotation of the steering wheel 18 and rotation of the valve stem 50, the inner valve member 40, if there is sufficient resistance to displacement of the rack 66 caused by frictional engagement of the vehicle tires with the ground or road surface, will be rotated about the axis 46 relative to the outer valve member 42. This relative rotation moves valving edges on the inner valve member 40 relative to valving edges on the sleeve 42, and creates, in a known manner, a demand for high pressure fluid from the pump 24, and directs high pressure fluid from the pump 24 to one of the motor conduits 28 or 30 and directs fluid from the other motor conduit to the reservoir 32.

For example, rotation of the inner valve member 40 in one direction relative to the outer valve member 42 will reduce the flow area communicating the motor conduit 28 with the reservoir 32 and increase the flow area communicating the motor conduit 28 with the pump 24. The relative rotation between the inner valve member 40 and outer valve member 42 also increases the flow area communicating the motor conduit 30 with the reservoir and reduces the flow area communicating the motor conduit 30 with the pump 24. The result is in higher pressure fluid being generated by the pump 24 which is conducted to the motor cylinder chamber 72. This higher pressure fluid will move the piston 76 toward the right as viewed in FIG. 1. As the piston 76 moves toward the right, fluid is forced from the chamber 74 through the motor conduit 30, the control valve 22, and the return conduit 34 to the reservoir 32.

As the power steering motor 31 operates, the rack 66, which is also the rod for the motor 31, rotates the pinion 64 and follow-up member 54. This rotation of the follow-up member 54 together with the torque from the torsion bar 51 rotates the outer valve member 42 relative to the inner valve member 40 tending to return the valve 22 to its open center, neutral position. When the power steering motor 31 is operated to turn the steerable vehicle wheels to an extent corresponding to the extent of rotation of the inner valve member 40, the feedback of the rotation of the follow-up member 54 caused by movement of the rack 66 rotates the pinion 64 through a distance sufficient to move the outer valve member 42 to its initial position relative to the inner valve member. When this occurs, the fluid pressure in the motor cylinder chambers 72 and 74 falls and equalizes and the motor 31 stops operating.

Pressurized fluid from the pump 24 is conducted to an annular central groove 80 formed in the outer valve member 42. Fluid flows to the inside of the outer valve member 42 through a pair of diametrically opposite passages 82 and 84. The inner and outer valve members 40 and 42 may have the same construction and cooperate with each other and the torsion bar in the same manner as described in U.S. Pat. No. 4,276,812 issued Jul. 7, 1981 and entitled "Power Steering Valve and Method of Making Same". However, the inner and outer valve members 40 and 42 could have a different construction if desired.

The control valve 22 is a "four land" type valve. The inner valve member 40 has a generally square cross-sectional configuration with rounded corners which form the four valving lands and cooperate with the edges of four axially extending grooves formed inside the outer valve member 42 to control the flow of fluid to and from the motor 31. The ends of one pair of diametrically opposite grooves on the inside of the outer valve member 42 are connected in fluid communication with an annular outer groove 88 connected with the motor conduit 28. A second pair of diametrically opposite and axially extending grooves on the inside of the outer valve member 42 are connected in fluid communication with an annular outer groove 90 formed in the outer valve member and connected with the motor conduit 30.

A pair of diametrically opposite openings 94 extend radially inward to an axially extending central passage in the inner valve member 40. The central passage is connected in fluid communication through an opening 96 extending radially outwardly from the axially extending central passage with a chamber 98 at the upper end of the housing 44. The chamber 98 is connected in fluid communication with the reservoir 32 by the return conduit 34.

The diametrically opposite openings 94 in the inner valve member 40 conduct fluid discharged from the steering motor 31 to the chamber 98. The chamber 98 is connected to the reservoir 32 by the return conduit 34. Fluid discharged from the steering motor 31 flows through the diametrically opposite openings 94 and the axially extending central passage to the chamber 98. From chamber 98 the fluid is conducted to the reservoir 32 by return conduit 34.

One end of the torsion bar 51 is drivingly connected to the valve stem 50 and the opposite end of the torsion bar is drivingly connected to the follow-up member 54. The torsion bar 51 resiliently deflects when subjected to torque fed back by ground resistance to steering movement of the steered wheels in a vehicle steering activity enabling relative rotation between the inner and outer valve members 40 and 42, and when free of torque, urges the inner and outer valve members 40 and 42 to their initial positions all as is well known in the art.

In accordance with the present invention, the torque required to actuate the control valve 22 is made to increase as vehicle speed increases. At relatively low vehicle speeds, relative rotation of the inner and outer valve members 40 and 42 is controlled by the spring constant of the torsion bar 51 and a relatively small torque is required to rotate the inner valve member 40 relative to the outer valve member 42 and hence actuate the hydraulic assist motor 31 making the steering feel less manual. At higher vehicle speeds, as a result of the operation of the mechanism described below, a larger torque is required to rotate the inner valve member 40 relative to the outer valve member 42 making the steering feel more manual.

An annular force transmitting member comprising a piston 116 (FIG. 1) is disposed in a cylindrical bore in the power steering control valve housing 44. The force transmitting member 116 is coaxial with the outer valve member 42, and is rotationally fixed to and rotates with the outer valve member 42, and is movable axially along the valve stem 50 relative to the inner valve member 40 and the outer valve member 42.

The force transmitting member 116 (FIG. 2) is connected with the outer valve member 42 by a pin 120. The pin 120 is fixedly connected to the outer valve member 42 and extends into an axially extending slot 122 in the force transmitting member 116 Thus, the pin 120 rotates the force transmitting member 116 with the outer valve member 42, and the slot 122 permits the force transmitting member 116 to move axially relative to the inner valve member 40 and outer valve member 42.

Figure 2:
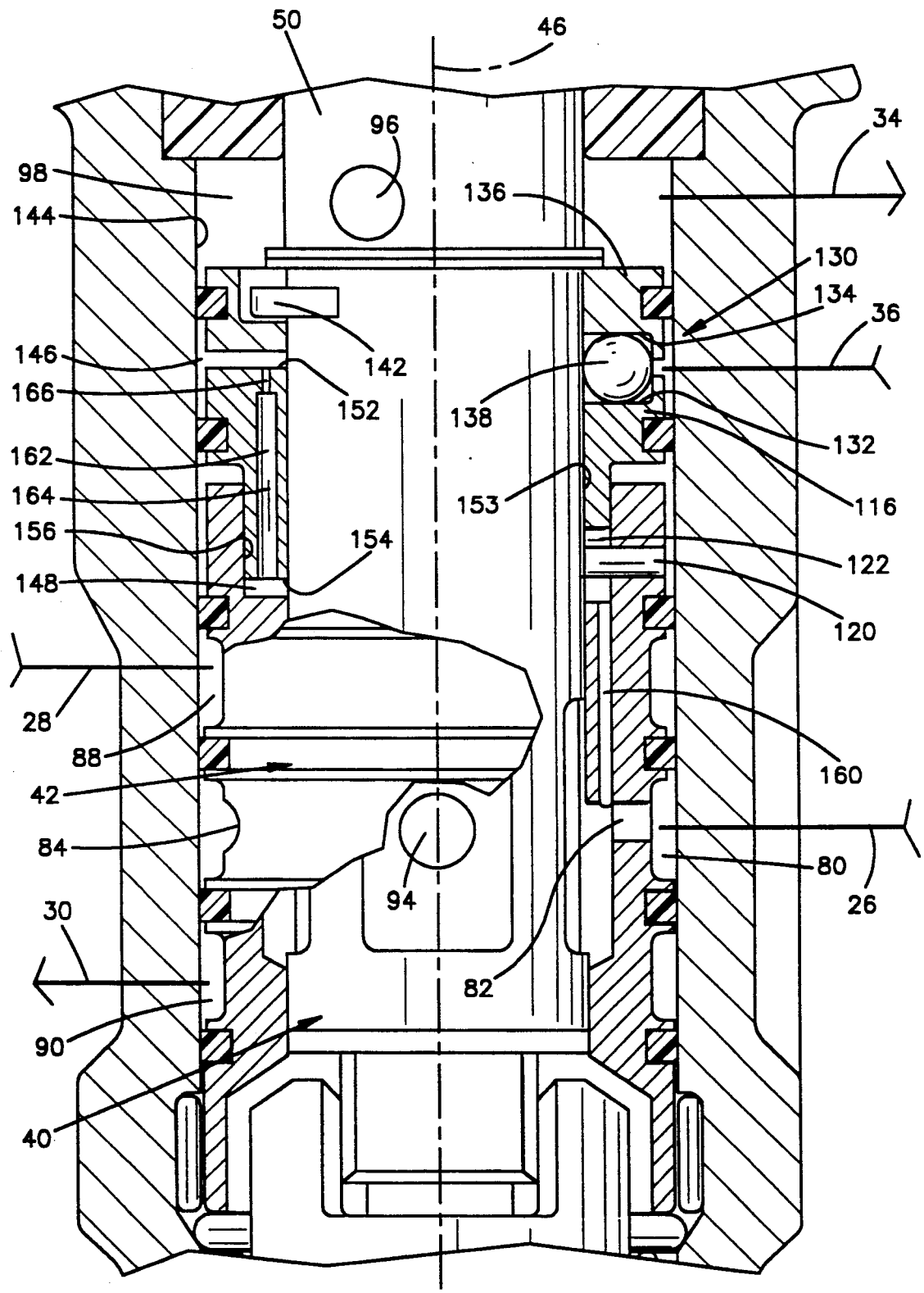
FIG. 2 is an enlarged fragmentary sectional view of a portion of FIG. 1.

The force transmitting member 116 is connected with the inner valve member 40 by a cam assembly 130 (FIGS. 1 and 2). The cam assembly 130 includes a plurality of upwardly (as shown in FIG. 2) facing cam surfaces 132 on the force transmitting member 116, a plurality of downwardly (as shown in FIG. 2) facing cam surfaces 134 on a cam plate 136 which is fixedly connected to the inner valve member 40, and a plurality of balls or spherical cam elements 138 located between the cam surfaces 132 and 134. The cam plate 136 is fixedly connected to the inner valve member 40 by a pin 142. Thus, the plate 136 rotates with the inner valve member 40 and the input member 50.

A pair of annular pressure chambers 146 and 148 are located on axially opposite sides of the force transmitting member 116. The fluid pressure in chamber 146 applies a force that urges the force transmitting member 116 away from the cam plate 136 and the balls 138. The fluid pressure in chamber 148 applies a force that urges the force transmitting member 116 toward the cam plate 136 and the balls 138.

An annular upper side 152 of the force transmitting member 116 cooperates with a cylindrical inner side surface 144 of the housing 44 and a cylindrical outer side surface 153 of the input member 50 to define the fluid pressure chamber 146. Similarly, an annular lower side 154 of the force transmitting member 116 cooperates with an inner side surface 156 of the outer valve member 42 and the outer side surface 153 of the input member 50 to define the annular pressure chamber 148.

The outer valve member 42 includes an axially extending passage 160. The axially extending passage 160 conducts fluid from the pump 24 and the annular central groove 80 to the fluid pressure chamber 148. Thus, the fluid pressure in chamber 148 varies according to the steering demand.

The force transmitting member 116 includes an axially extending passage 162 that conducts fluid from the fluid pressure chamber 148 to the fluid pressure chamber 146. The fluid passage 162 in the force transmitting member 116 includes a portion 164 with a relatively large diameter and a portion 166 with a relatively small diameter. The passageway 162 is sized to provide fluid to the fluid pressure chamber 146 without interfering with the operation of the power steering motor 31.

Upon rotation of the steering wheel 18 and the input member 50, the cam plate 136 rotates relative to the force transmitting member 116, and the outer side surfaces of the cam elements or balls 138 roll on the cam surfaces 132 and 134. As this occurs, the force transmitting member 116 is moved axially against the influence of the fluid pressure in chamber 148.

The balls 138 act as driving connections between the force transmitting member 116 and the inner valve member 40. Upon relative rotation between the inner valve member 40 and the outer valve member 42, the cam surfaces 132 and 134 in the force transmitting member 116 and outer valve member 42, respectively, create axial and tangential forces on the balls 138. Depending on the pressures in chambers 146 and 148, these forces translate into torque in the steering column felt by the operator of the vehicle and resist relative rotation of the inner and outer valve members 40 and 42.

Relative rotation between the inner valve member 40 and the outer valve member 42 causes the spherical elements 138 to roll ©n the cam surfaces 132 and 134 and therefore to move the force transmitting member 116 axially away from the cam plate 136. The force required to move the force transmitting member 116 axially away from the cam plate 136 varies as a function of the net force urging the force transmitting member 116 toward the cam plate 136. Thus, the greater the net torque urging the force transmitting member 116 against the balls 138, the greater is the torque required to rotate the valve stem 50 and inner valve member 40 relative to the outer valve member 42. The net force pressing the force transmitting member 116 against the cam elements 138 is equal to the difference between the force applied by the fluid pressure in chamber 146 against the side 152 of the force transmitting member 116 and the fluid pressure force applied by the fluid in chamber 148 against the side 154 of the force transmitting member. The smaller the fluid pressure force applied against the side 152 of the force transmitting member 116, the greater is the torque which must be overcome to rotate the valve stem 50 relative to the force transmitting member 116 and the outer valve member 42.

As noted above, the power steering control system includes the speed responsive control unit 38 (FIG. 1). The speed responsive control unit 38 is operable to vary the fluid pressure in the chamber 146 with changes in vehicle speed. The speed responsive control unit 38 is connected in fluid communication with the chamber 146 by the return conduit 36. The speed responsive control unit 38 is a valve that is slightly open at engine idle and increasingly opens as vehicle speed increases. Thus, the speed responsive control unit 38 allows fluid flow from the fluid pressure chamber 146 to the reservoir 32 at all times when the pump 24 is operating. However, the flow permitted increases with increasing vehicle speed. Hence, as vehicle speed increases, the pressure in chamber 146 decreases and at high vehicle speeds the pressure in fluid chamber 146 is relatively low. At low vehicle speeds and at engine idle, flow through the speed responsive control unit 38 to the reservoir 32 is low, flow through the orifice 166 creates a high pressure in the chamber 146, hence the pressure in chamber 146 is relatively high.

The greater the pressure in the chamber 146, the greater is the fluid pressure force urging the force transmitting member 116 downwardly (as viewed in FIG. 2) against the influence of the fluid pressure in chamber 148. The greater the force urging the force transmitting member 116 against the fluid pressure in the chamber 148, the smaller is the torque required to rotate the input member 50 relative to the outer valve member 42 so that hydraulic assist is provided to the steering motor 31 and the steering effort feels less manual to the operator.

The surface area of the side 154 of the force transmitting member 116 is smaller than the surface area of the side 152. The surface areas of the sides 152 and 154 are sized relative to each other such that at a relatively low vehicle speed the force applied to the side 152 by the fluid pressure in chamber 146 is equivalent to the force applied to the side 154 by the fluid pressure in chamber 148. Thus, upon rotation of the steering wheel 18 and input member 50, the force transmitting member 116 provides minimal, if any, resistance to relative rotation between the inner valve member 40 and the outer valve member 42 and the steering feels less manual.

When the vehicle is travelling at a relatively high speed, the speed responsive control unit 38 is substantially open. Thus, relatively low fluid pressure exists in the portion of the return conduit 36 upstream from the speed responsive control unit 38, and there is a relatively low fluid pressure in the pressure chamber 146. Since the pressure in the chamber 146 is relatively low at high vehicle speeds, there is a relatively small fluid pressure force in the chamber 146 to offset the fluid pressure force in the chamber 148. Upon rotation of the steering wheel 18 and input member 50, the cam elements 138 exert a force on the cam plate 136. This force resists rotation of the cam plate 136 and the input member 50 relative to the outer valve member 42. Therefore, substantial resistance is encountered to rotation of input member 50 and inner valve member 40 relative to the outer valve member 42 at relatively high vehicle speeds and the steering feels more manual.

From the above description of a preferred embodiment of the invention, those skilled in the art will perceive improvements, changes and modifications. Such improvements, changes and modifications within the skill of the art are intended to be covered by the appended claims.

Having described the invention, the following is claimed:

1. An apparatus comprising:
   first and second valve members which are relatively movable to port fluid to a vehicle power steering motor;
   a force transmitting member for applying a net force acting in a first direction that varies as a function of vehicle speed and resists relative movement between said first and second valve members;
   means defining a first fluid pressure chamber disposed on one side of said force transmitting member, the fluid pressure in said first fluid pressure chamber urging said force transmitting member in said first direction;
   means defining a second fluid pressure chamber disposed on another side of said force transmitting member, the fluid pressure in said second fluid pressure chamber urging said force transmitting member in a direction opposite said first direction; and
   means for decreasing the fluid pressure in said second fluid pressure chamber as vehicle speed increases to thereby increase the resistance to relative movement between said first and second valve members as vehicle speed increases.

2. An apparatus comprising:
   first and second valve members which are relatively movable to port fluid to a vehicle power steering motor;
   a force transmitting member for applying a net force acting in a first direction that varies as a function of vehicle speed and resists relative movement between said first and second valve members;
   means defining a first fluid pressure chamber disposed on one side of said force transmitting member, the fluid pressure in said first fluid pressure chamber urging said force transmitting member in said first direction;
   means defining a second fluid pressure chamber disposed on another side of said force transmitting member, the fluid pressure in said second fluid pressure chamber urging said force transmitting member in a direction opposite said first direction;
   means for decreasing the fluid pressure in said second fluid pressure chamber as vehicle speed increases to thereby increase the resistance to relative movement between said first and second valve members as vehicle speed increases;
   means for enabling the fluid pressure in said first fluid pressure chamber to be proportional to the pressure in the power steering motor; and
   means defining an orifice conducting fluid from said first fluid pressure chamber to said second fluid pressure chamber.

3. An apparatus as set forth in claim 2 wherein said orifice is located in said force transmitting member.

4. An apparatus comprising:
   first and second valve members which are relatively movable to port fluid to a vehicle power steering motor;
   a force transmitting member for applying a net force acting in a first direction that varies as a function of vehicle speed and resists relative movement between said first and second valve members;
   means defining a first fluid pressure chamber disposed on one side of said force transmitting member, the fluid pressure in said first fluid pressure chamber urging said force transmitting member in said first direction;
   means defining a second fluid pressure chamber disposed on another side of said force transmitting member, the fluid pressure in said second fluid pressure chamber urging said force transmitting member in a direction opposite said first direction, only the difference between the fluid pressures in said first and second fluid pressure chambers determines the force that said force transmitting member applies to resist relative movement between said first and second valve members; and means for decreasing the fluid pressure in said second fluid pressure chamber as vehicle speed increases to thereby increase the resistance to relative movement between said first and second valve members as vehicle speed increases.

5. An apparatus as set forth in claim 4 wherein fluid in said first fluid pressure chamber applies a force to a first end of said force transmitting member and fluid in said second fluid pressure chamber applies a force to a second end of said force transmitting member, the surface area of said first end of said force transmitting member being smaller than the surface area of said second end of said force transmitting member.

6. An apparatus as set forth in claim 4 wherein the force acting on said force transmitting member due to the fluid pressure in said first fluid pressure chamber is approximately equal to the force acting on the force transmitting member due to the fluid pressure in said second fluid pressure chamber when the vehicle engine is at idle.

7. An apparatus as set forth in claim 4 further including conduit means conducting fluid from said second fluid pressure chamber, said means for decreasing the fluid pressure in said second fluid pressure chamber including valve means for connecting said conduit means with reservoir.

8. An apparatus as set forth in claim 4 wherein said first and second valve members are rotatable relative to each other about a common central axis, said force transmitting member being movable along the central axis to vary the resistance to relative movement between said first and second valve members.

9. An apparatus as set forth in claim 4 wherein said first and second valve members comprise a valve core and a valve sleeve encircling said valve core, said valve core and valve sleeve being relatively rotatable and said force transmitting member comprises a piston, and further including means connecting said piston to said valve sleeve for rotation with said valve sleeve and for axial movement relative to said valve sleeve.

10. An apparatus as set forth in claim 9 further including a collar fixedly connected to said valve core and force transmitting means between said piston and said collar, and said first direction being a direction in which said piston is urged toward said collar.

11. An apparatus as set forth in claim 10 wherein said second fluid pressure chamber is located between said piston and said collar.

12. An apparatus comprising:

first and second valve members which are relatively movable to port fluid to a vehicle power steering motor;

a force transmitting member for applying a net force acting in a first direction that varies as a function of vehicle speed and resists relative movement between said first and second valve members;

means defining a first fluid pressure chamber disposed on one side of said force transmitting member, the fluid pressure in said first fluid pressure chamber providing a first force urging said force transmitting member in said first direction;

means defining a second fluid pressure chamber disposed in another side of said force transmitting member, the fluid pressure in said second fluid pressure chamber providing a second force urging said force transmitting member in a direction opposite said first direction, said first force, at all times, being at least equal to said second force; and means tending to equalize said first and second forces as vehicle speed decrease to thereby decrease the resistance to relative movement between said first and second valve members as vehicle speed increases.

13. An apparatus as set forth in claim 2 further including means for enabling the fluid pressure in said first fluid pressure chamber to be proportional to the pressure in the power steering motor and means defining an orifice conducting fluid from said first fluid pressure chamber to said second fluid pressure chamber.

14. An apparatus as set forth in claim 12 wherein said first and second valve members comprise a valve core and a valve sleeve encircling said valve core, said valve core and valve sleeve being relatively rotatable and said force transmitting member comprises a piston, and further including means connecting said piston to said valve sleeve for rotation with said valve sleeve and for axial movement relative to said valve sleeve.

15. An apparatus as set forth in claim 14 further including a collar fixedly connected to said valve core and force transmitting means between said piston and said collar, and said first direction being a direction in which said piston is urged toward said collar.

16. An apparatus as set forth in claim 15 wherein said second fluid pressure chamber is located between said piston and said collar.

17. An apparatus as defined in claim 13 wherein said means tending to equalize said first and second forces includes a speed responsive valve connecting said second chamber to reservoir and which restricts communication between said second chamber and reservoir as vehicle speed decreases.

* * * * *

UNITED STATES PATENT AND TRADEMARK OFFICE
CERTIFICATE OF CORRECTION

PATENT NO.   : 5,291,963
DATED        : March 8, 1994
INVENTOR(S)  : Henry C. Sangret It is certified that error appears in the above-identified patent and that said Letters Patent is hereby corrected as shown below:

Column 10, line 21, after "speed" change "decrease" to --decreases--.

Column 10, line 25, change "2" to --12--.

Signed and Sealed this

Second Day of August, 1994

Attest:

BRUCE LEHMAN

Attesting Officer

Commissioner of Patents and Trademarks